(No Model.)
D. HARRIS.
FISHING REEL.
No. 431,142. Patented July 1, 1890.
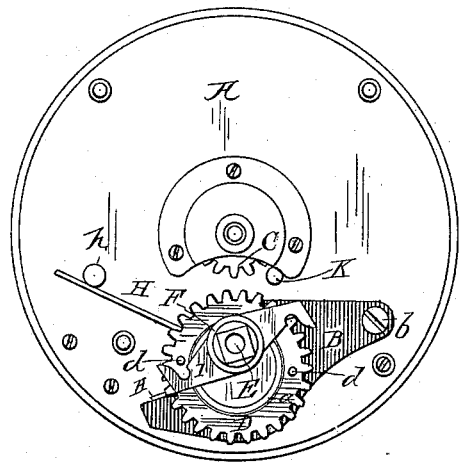
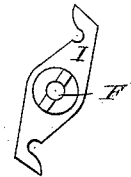
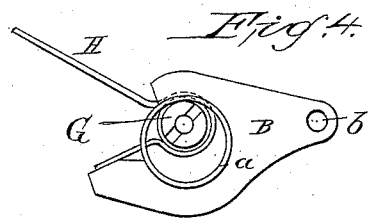
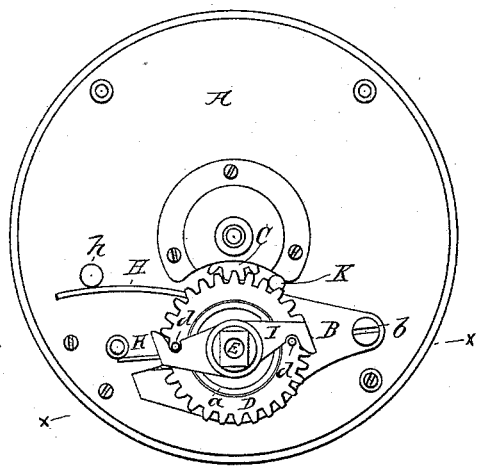
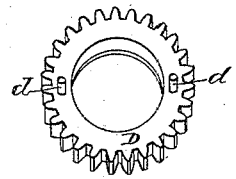
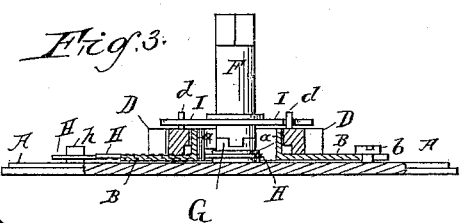
WITNESSES:
C. W. Benjamin
Jadock Strauss
David Harris
INVENTOR
By Henry P. Wells
his ATTORNEY
THE NORRIS PETERS CO., PHOTO-LITHO., WASHINGTON, D. C.

UNITED STATES PATENT OFFICE.

DAVID HARRIS, OF BROOKLYN, NEW YORK.

FISHING-REEL.

SPECIFICATION forming part of Letters Patent No. 431,142, dated July 1, 1890.

Application filed January 19, 1889. Serial No. 296,891. (No model.)

*To all whom it may concern:*

Be it known that I, DAVID HARRIS, of the city of Brooklyn, in the county of Kings and State of New York, have invented a new and useful Improvement in Fishing-Reels, of which the following is a specification, reference being had to the accompanying drawings.

My invention relates to that class of fishing-reels known as "free-running" reels, in which the spool is or may be free to rotate in either direction without click or drag. This variety of reel is also usually provided with gearing in order that the rotation of the handle may be multiplied at the spool. As these reels are usually employed for casting a bait, it is desirable that the spool during that operation should rotate with the least possible friction. Again, these reels are employed against fish of great power and weight. When fastened, they take line from the reel so quickly as to cause the handle of the reel to rotate with great velocity and force. If in the excitement of the struggle the angler allows the spinning-handle to come into contact with his hands, severe injury may and often has been the result. For these reasons it is very desirable in this variety of reel that the handle and its accessories should only move in sympathy with the spool when the line is to be reeled in. My invention, I believe, is the first automatically to meet these requirements.

In the drawings forming part of this specification, Figure 1 is a plan view of the handle side of such a reel, showing the normal position of the mechanism constituting my invention, the same being out of mesh, so that the spool is free to rotate independently of the handle. Fig. 2 is a similar view showing said mechanism during the act of winding in the line—that is, in mesh—so that the spool of the reel must respond to the action of the handle. Fig. 3 is a sectional elevation of the parts of my movement on the line *x x* of Fig. 2. Fig. 4 is a detached view of the pivoted bed-piece, which carries upon and with it most of the movable parts of my movement. Fig. 5 is a detached view of the annular geared wheel, the intermeshing or retraction of which engages or releases the axle of the spool; and Fig. 6 is a detached view of the clutch through which the handle engages the annular geared wheel aforesaid.

In the drawings, A is the handle side of the reel.

B is a bed-piece so hinged on the pivot *b* that it may be moved toward or away from the gear C, rigidly secured to the axle of the spool. The bed-piece B is provided with an annular flange *a*, projecting above its outer surface, as shown in Fig. 4, to a height equal to the thickness of the geared wheel D, which fits around it, as shown in Figs. 1 and 3, with the two pins *d d* uppermost. Thus the geared wheel D is carried toward or withdrawn from the center pinion C in unison with the motion of the hinged bed-piece B.

E is a standard rigidly and perpendicularly secured in the usual manner in plate A, upon which turns the sleeve F, to which the handle is attached. For the sake of clearness the handle is not shown in the drawings. It is of the ordinary crank form, secured on the square head of the sleeve F in the ordinary manner. The sleeve F, to facilitate assembling and separating the parts, is in two portions, connected by any form of clutch. The upper portion of this sleeve is indicated by F, and the lower part by G, as shown in Fig. 3. Attached to the part G is the forked spring H, one end of which bears against the stud *h*, while the other bears against the hinged bed-piece B in such a way as to tend to throw said bed-piece away from the center pinion C. The sleeve F, which carries the handle of the reel, is provided near its lower end with the clutch I. (Shown detached in Fig. 6 and in position in Figs. 1, 2, and 3.)

The parts go together as follows, (see Fig. 3:) The lower detached end G of the sleeve F is placed on the standard E, so that the longer end of the forked spring H engages with the stud *h*. The hinged bed-piece B is then attached in the position shown, so that its longer extremity engages with the shorter leg of the spring H, and so that the shorter part G of the sleeve F appears in the annular opening of the bed-piece. The geared wheel D is then placed upon the bed-piece B, as hereinbefore indicated. The remaining portion of the sleeve F (bearing the clutch I) is then slipped upon the standard E, as shown in Fig. 3, and my device is ready for use.

It operates as follows: As long as no torsion is applied to the sleeve F by the handle of the reel, the spring H keeps the hinged bed-piece B, and consequently the geared wheel D, away from the center pinion C, as shown in Fig. 1; but the moment the handle is turned in the proper direction the sleeve F partakes of its motion, carrying with it the clutch I. This engages with the pins $d\ d$ in the geared wheel D, throwing it (D) and the bed-piece B toward and into mesh with the center pinion and compelling the geared wheel D to center on the standard E, as shown in Fig. 2. The handle rotates the geared wheel D, which drives the pinion C. As long as the power continues to be applied, so long will the position of the bed-piece B toward the center pinion C compress the spring H, as shown in Fig. 2. The moment the power ceases that moment the spring H throws the bed-piece B and all that is connected with it into the position shown in Fig. 1.

Such are the essential features of my device. It will be clear from the foregoing that its operation is controlled by the action of the clutch I (attached to the sleeve F) upon the pins $d\ d$ in the geared wheel D. As long as those pins are in contact with the clutch, the geared wheel D is centered on the standard E and in mesh with the pinion C. Before the spring H can throw the bed-piece B away from the pinion C, and thus withdraw the wheel D, those pins ($d\ d$) must escape from the clutch I. If the clutch I is shaped exactly right, the action of the spring H on the bed-piece B may accomplish this. To obviate the necessity of special care as to the form of the clutch I or uncertainty in the action of my device arising from wear to said clutch, I prefer the following construction: The forked spring H is rigidly secured to the hub G, (the lower portion of the sleeve F.) Now the wheel D does not move until the clutch I encounters its pins $d\ d$. Therefore the first action of the handle to wind in the line turns the hub G, but not the wheel D. The consequence is that the spring H becomes partly compressed, and its shorter leg leaves the bed-piece B before the bed-piece begins to move. When the rotation of the sleeve F has carried the clutch into contact with the pins $d\ d$, the bed-piece B is moved inward and the wheel D is thrown into mesh, as hereinbefore described. Upon release of the handle the first action of the spring is to get rid of the initial portion of its tension by turning the hub G backward a little. This carries the clutch I backward with it sufficiently to withdraw it from said pins $d\ d$. Then the residual tension of the spring H acts on the bed-piece B to move it away from the pinion C, and the wheel D is withdrawn from mesh, as hereinbefore described.

It will be noticed that the handle is thrown into connection with the center pinion C by motion in one direction only. If the handle is moved by mistake in the opposite direction, the geared wheel D merely turns on the bed-piece B, and no injury to the mechanism or other result follows. It is well to provide a stop K to limit the inward motion of the bed-piece B.

Having thus described my invention, what I claim as new, and desire to secure by Letters Patent, is—

1. The combination of a reel-frame, a spool having a pinion on its shaft, a pivoted swinging frame having a pinion normally out of contact with the pinion on the staff, a handle, and actuating-spring-controlled gearing on said pivoted frame for meshing the pinion of the frame with the pinion of the shaft when the handle is turned.

2. The combination, in a fishing-reel, of a reel-frame, a spool having a pinion on its shaft, a bed-plate hinged by one end to the frame and having an annular opening at the other end, a gear-wheel on said bed-plate and normally out of contact with the pinion on the staff, a shaft having a clutch for engaging with the bed-plate pinion, and a spring acting upon said bed-plate to return the bed-plate pinion to its normal position.

3. The combination of a reel-frame, a spool having a pinion on its shaft, a hinged bed-piece carrying a pinion, a shaft having a clutch, and a spring operated upon by the shaft to force the bed-plate pinion to mesh with the pinion on the staff and return the bed-plate pinion to its normal position when the clutch-shaft is released.

4. The combination of a reel-frame, a spool having a pinion on the shaft thereof, a swinging pinion, and spring-actuating mechanism for holding the swinging pinion out of contact with the pinion on the shaft and for meshing said pinion with the shaft-pinion when the handle is turned to wind up the line.

In testimony that I claim the foregoing improvement in fishing-reels, as above described, I have hereunto set my hand this 14th day of January, 1889.

DAVID HARRIS.

Witnesses:
COLEND SCOT HART,
ZADOCK STRAUSS.